US006761849B2

(12) United States Patent
Quinn et al.

(10) Patent No.: US 6,761,849 B2
(45) Date of Patent: Jul. 13, 2004

(54) BLADDER LIFTING APPARATUS AND METHOD

(75) Inventors: Thomas Francis Quinn, Wadsworth, OH (US); Gary Bernard Shumacher, Navarre, OH (US); Randy Ray Beller, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 543 days.

(21) Appl. No.: 09/919,539

(22) Filed: Jul. 31, 2001

(65) Prior Publication Data

US 2003/0025249 A1 Feb. 6, 2003

(51) Int. Cl.[7] .............................................. B29C 35/00
(52) U.S. Cl. ..................... 264/334; 264/326; 425/48; 425/58
(58) Field of Search .............................. 425/43, 48, 58, 425/52; 264/315, 326, 334, 39

(56) References Cited

U.S. PATENT DOCUMENTS

| 4,508,233 A | | 4/1985 | Helms ........................ 212/182 |
| 4,588,165 A | * | 5/1986 | Stellato et al. .............. 254/8 B |
| 5,064,334 A | | 11/1991 | Cooley ........................ 414/428 |
| 5,211,526 A | | 5/1993 | Robinette .................... 414/550 |
| 5,360,327 A | | 11/1994 | Ichikawa ...................... 425/38 |
| 5,383,758 A | | 1/1995 | Patrick ........................ 414/680 |
| 5,522,716 A | | 6/1996 | Ureshino ...................... 425/48 |
| 5,746,964 A | | 5/1998 | Ureshino et al. ........... 264/315 |
| 6,077,469 A | | 6/2000 | Golightly et al. ........... 264/130 |

* cited by examiner

Primary Examiner—Mathieu D. Vargot
(74) Attorney, Agent, or Firm—Brouse McDowell; Roger D. Emerson

(57) ABSTRACT

A bladder removing apparatus for a tire vulcanizer having a movable boom swiveled on a horizontally movable platform with a flexible connecting member carried by the boom for attachment to the bladder, whereby the platform is moveable and the boom is swingable into a centered position of the bladder, upon lifting of said bladder.

8 Claims, 4 Drawing Sheets

BLADDER LIFTING APPARATUS AND METHOD

I. TECHNICAL FIELD

This invention relates to a lifting apparatus for removing a part, such as a tire vulcanizer bladder in a centered position, to avoid damage to adjacent parts and seals in a tire vulcanizer during the bladder removal process.

II. BACKGROUND OF THE INVENTION

A bladder removal mechanism in which a center post is required to center the bladder is shown in U.S. Pat. No. 5,522,716. This mechanism is not adaptable to tire vulcanizers which do not have center posts of that type.

Also, in U.S. Pat. No. 5,360,327 a bladder replacing apparatus is provided which is mounted on the loader of the tire vulcanizing press. Since the loader is centered, the loading and unloading of the bladder is automatically in a centered position. This apparatus is not moveable from one tire vulcanizer to another because it is attached to the loader of the vulcanizer.

Bladders have also been removed and installed with a jib crane mounted on a forklift truck. It has been difficult to position the end of the jib crane over the bladder with this apparatus and as a result bladders have been pulled off at an angle, which has damaged the seals in the tire vulcanizer. Also, the molds and vulcanizer have been damaged. Two men have been needed to operate the forklift truck and jib crane, which has increased the cost of this operation.

III. SUMMARY OF THE INVENTION

The present invention is directed to a bladder loading and unloading apparatus for a tire vulcanizer wherein one operation can handle and center so that the bladders can be removed without damaging the vulcanizer molds and seals. A forklift truck may be used to lift the apparatus into a position adjacent the molds of the open vulcanizer. A separate boom for each bladder is connected to a respective bladder by a chain and the boom is raised extending the chain. Because of the flexibility of the apparatus of this invention the end of the boom may be moved to a centered position and then the boom may be raised to lift the bladder. The bladder is pulled out of the vulcanizer in a centered position and the seals are not damaged. This result is achieved without requiring the positioning of the apparatus in a precise relationship with the tire vulcanizer and therefore not only avoids damage to the tire vulcanizer and the seals, but the time required for the bladder servicing is reduced.

In accordance with one aspect of the invention there is provided a method of removing a tire forming bladder from a tire vulcanizer with a bladder removing apparatus, having a bladder lifting boom mounted on a horizontally movable platform, and an elongated flexible connecting member having a boom connecting end connected to the boom and a bladder connecting end comprising:

(a) fastening the bladder connecting end of the flexible connecting member to the bladder;

(b) raising the boom and placing the connecting member in tension for pulling the horizontally movable platform towards the bladder to a centered position wherein the boom connecting end of the flexible connecting member is positioned substantially directly over the bladder connecting end; and, (c) continuing to raise the boom to lift the bladder in a centered position and remove the bladder from the tire vulcanizer in a vertical direction.

In accordance with another aspect of the invention there is provided a bladder lifting apparatus for lifting a tire forming bladder in an operating position to a detached lifted position directly over the operating position characterized by:

(a) a supporting frame movable into a position adjacent the operating position;

(b) a movable platform slidably mounted on the frame for sliding movement toward and away from the operating position;

(c) a lifting boom having an inner end mounted on the platform and outer end extending to a position over the bladder;

(d) a flexible connecting member extending from the outer end of the lifting boom to the bladder body;

(e) means to connect the flexible connecting member to the bladder, and;

(f) means to lift the lifting boom to put the connecting member in tension whereby, the movable platform is moved toward the operating position of the bladder and the boom is rotated into position with the outer end extending toward the centered operating position so that the bladder may be raised to the detached position directly over the operating position without any sidewise movement.

IV. BRIEF DESCRIPTION OF THE DRAWINGS

V. DETAILED DESCRIPTION OF INVENTION

Figure 1:
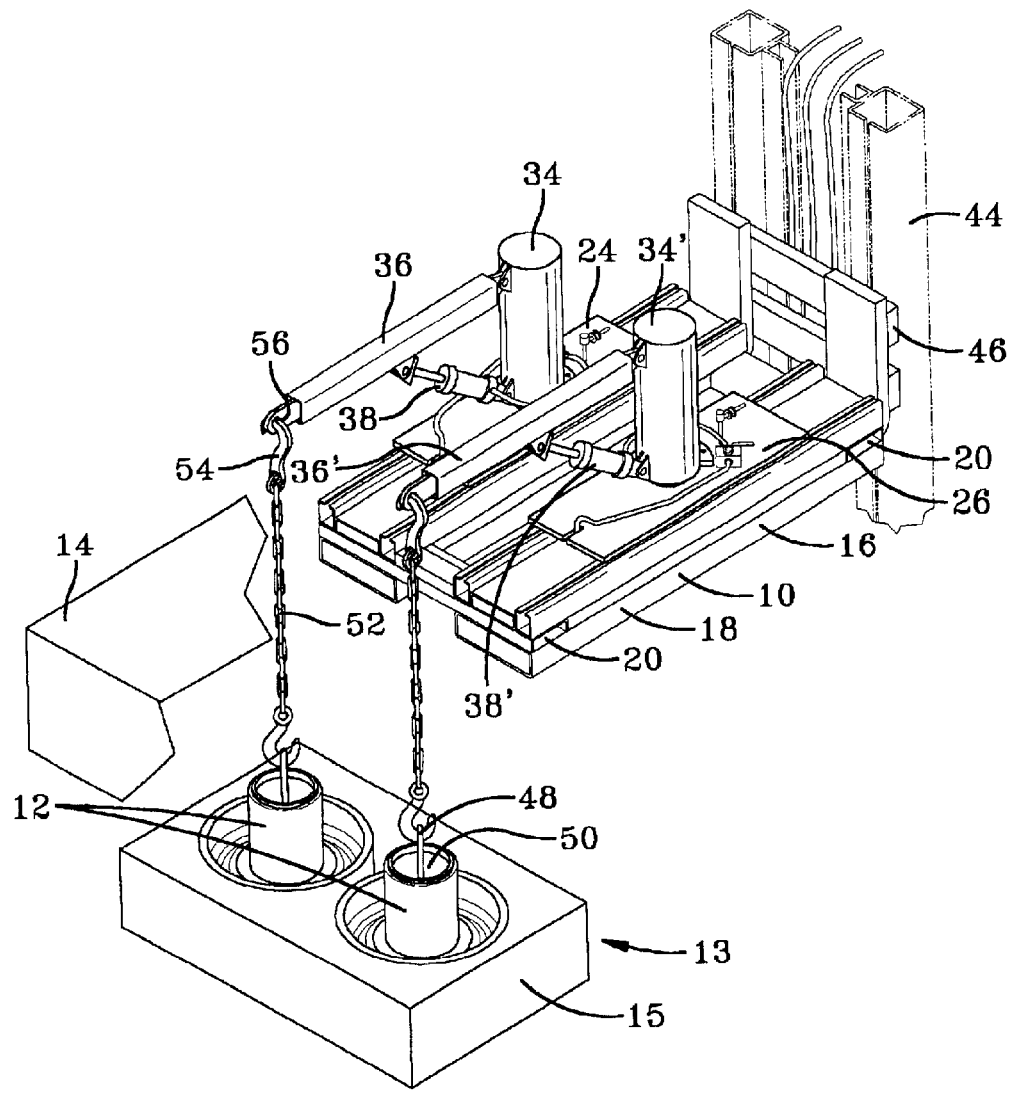
FIG. 1 is a view in perspective of the general assembly in position for removing a bladder with parts being broken away.
Figure 2:
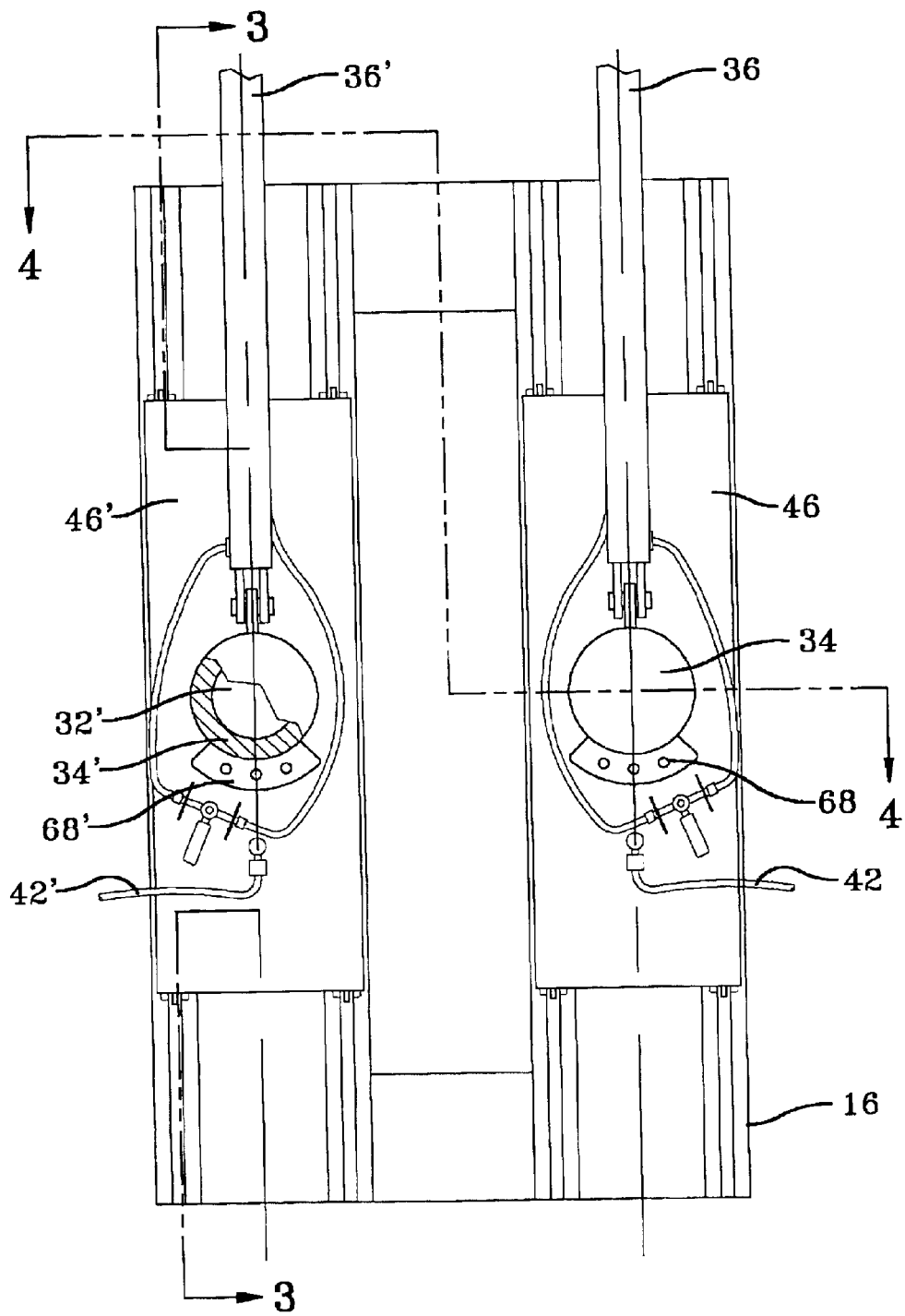
FIG. 2 is a plan view of the apparatus shown in FIG. 1 with parts broken away to show the post and sleeve construction.

Referring to FIG. 1, a self-centering lifting apparatus, such as a tire vulcanizer bladder changing apparatus 10, is shown in the position for changing bladders 12. A tire vulcanizer 13, is shown in the open position with the upper mold half 14 lifted off the lower mold half 15. The bladder changing apparatus 10 has a frame 16 with box beams 18 connected by channels 20 supporting rails 22 mounted on the channels. Supporting platforms 24 and 26 are slidably supported on rollers 28 and 30, positioned on the rails 22.

The following description for platform 26 also applies to platform 24 and the corresponding parts for platform 24 are given the same numeral with a ' mark. Supporting platform 26 has a post 32 mounted on the platform 24 as by welding. Rotatably mounted over the post is a sleeve 34. Hinged on the sleeve 34, is a bladder-lifting boom 36 that can be raised and lowered by a piston cylinder assembly 38 extending between the sleeve 34 and the boom 36. The piston cylinder assembly 38 is actuated by hydraulic fluid from a hydraulic air pressure exchanger 40 receiving air under pressure, such as factory air through a quick disconnect fixture attached to conduit 42.

Figure 3:
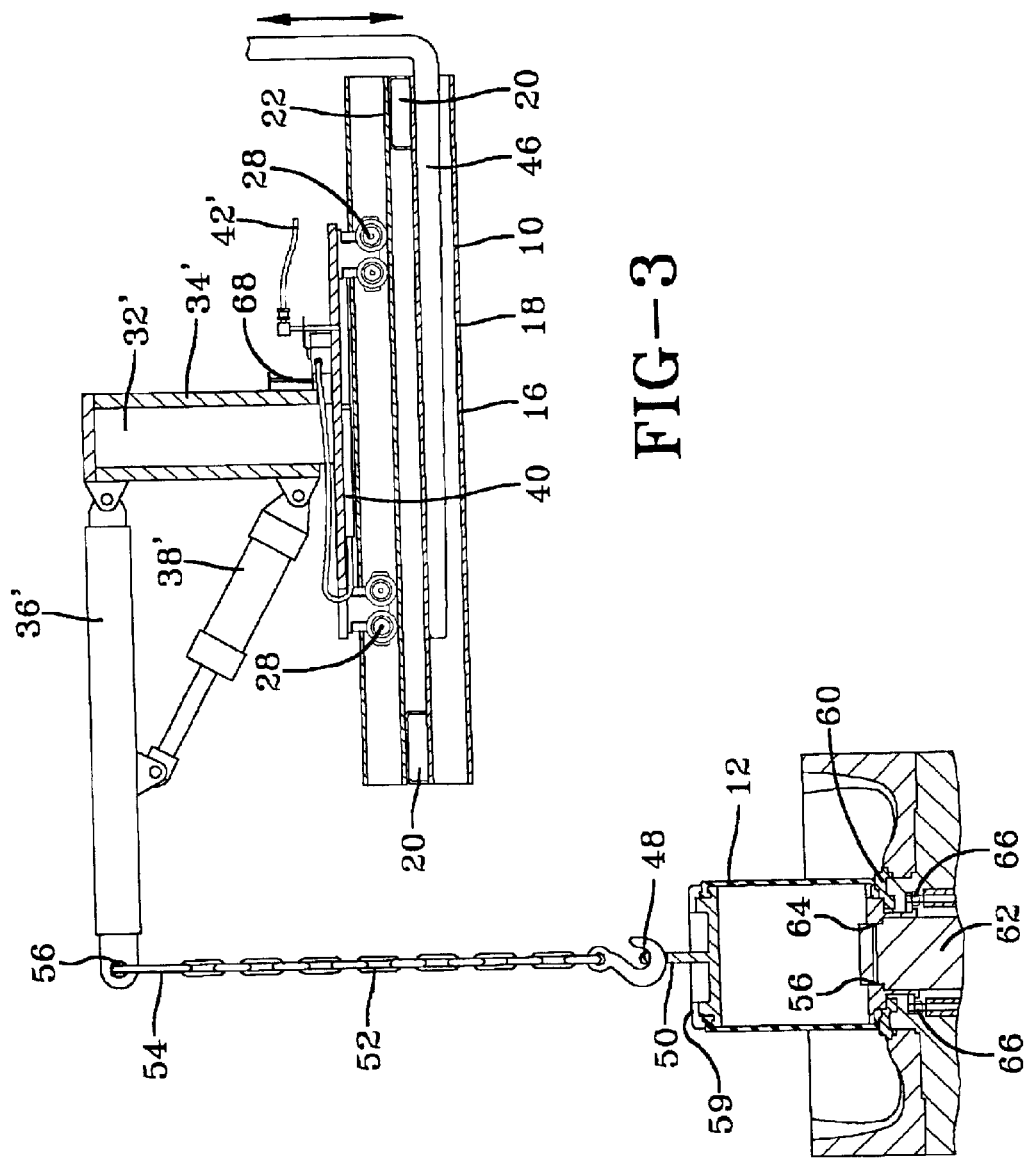
FIG. 3 is sectional view taken along the plane of line 3—3 in FIG. 2 with a sectional view of the bladder shown mounted in the tire vulcanizer.
Figure 4:
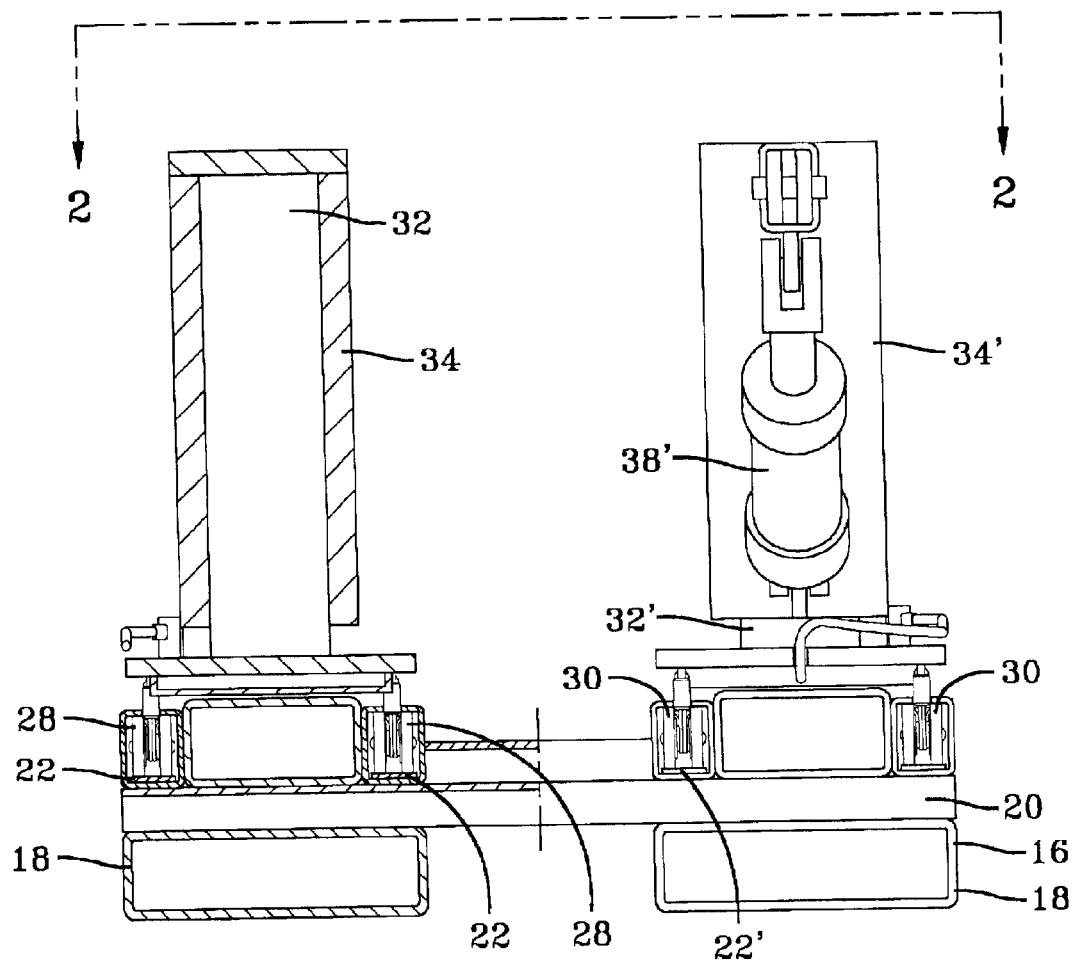
FIG. 4 is a sectional view taken along the plane of line 4—4 in FIG. 2.

As shown in FIGS. 1 and 3, the bladder changing apparatus 10 is mounted on suitable positioning means such as a fork truck 44, having fork members 46 which may be inserted in the box beams 18 for lifting and moving the apparatus 10 into a position proximate to the tire vulcanizer 14 as shown in FIGS. 1 and 3. The bladder 12 has a top plate 46 with the connecting members, such as eye 48 for receiving a bladder connection end or hook 50 of a connecting member, such as chain 52, which has a boom connecting end, such as hook 54 for positioning in an aperture 56 at the moveable end 58 of the boom 36.

Referring to FIG. 3 the bladder 12, with the top plate 46 and a lower plate 60 is positioned over a shaft 62 of the vulcanizer with seals 64 between the lower plate and the shaft. A suitable locking means 66 is provided to hold the bladder assembly 12 in the lower mold half 15 of the tire vulcanizer 14 during operation. The chain 52 is connected between the boom 36 and the bladder-connecting end 50.

In operation the bladder changing apparatus 10 is positioned adjacent to the tire vulcanizer 14 by inserting the fork members 46 of a forklift truck 44 into the box beams 18 and moving the apparatus 10 into a position between the bladders 12 and 12' of the tire vulcanizer as shown in FIG. 1 preferably with the platforms 24 and 26 in a retracted position adjacent the forklift truck. Chains 52 and 52' are then connected to the booms 36 and 36' and the lugs 48 and 48' of the bladder assemblies 12 and 12'. Air pressure is then communicated through the conduits 42 and 42' to the hydraulic/air pressure exchangers 40 and 40', providing hydraulic pressure to the piston cylinder assemblies 38 and 38' to lift the booms 36 and 36', placing the chains 52 and 52' in tension. In so doing, the chains 52 and 52' are pulled into a vertical position causing the booms 36 and 36' to rotate the sleeves 32 and 32' and the platforms 34 and 26 to slide towards the centered position. The chains 52 and 52' are then centered in a generally vertical position for pulling the bladder assemblies 12 and 12' out of the tire vulcanizer. At this time the vulcanizer bladder locking apparatus 66 and 66' are released and the bladders 12 and 12' pulled vertically off the shafts 62 without damaging the seals 64. Locking apparatus 68 consisting of plates mounted on the sleeves 34 and 34' having holes for inserting locking pins engageable with holes in the top plates 46, 46' may be provided to prevent swinging of the booms 36 and 36' when the bladder lifting apparatus is being transported from one tire vulcanizer to another. The pins may be removed after the chains 52 and 52' are connected tot the bladder connecting ends 50 and 50'

While certain representative embodiment and details have been shown for the purpose of illustrating the invention, it will be apparent to those skilled in the art that various changes and modifications may be made therein without departing from the scope of the invention. Having thus describing the invention, it is now claimed:

We claim:
1. A method of removing a tire-forming bladder from a tire vulcanizer with a bladder removing apparatus having a bladder-lifting boom swiveled on a horizontally movable platform and a connecting member having a boom-connecting end connected to said boom and a bladder connecting end comprising
   (a) moving said platform towards said bladder;
   (b) fastening said bladder connecting end of said connecting member to said bladder;
   (c) raising the boom and placing the connecting member in tension for pulling the horizontally movable platform towards the bladder to a centered position and swiveling said boom to a position wherein the boom-connecting end of the connecting member is positioned substantially directly over the bladder connecting end in a centered position; and
   (d) continuing to raise the boom to lift the bladder in a centered position and remove the bladder from the tire vulcanizer in a direction without any sidewise movement.

2. The method of claim 1, wherein said bladder lifting boom is swiveled on said platform for swinging side to side movement in a generally horizontal direction further characterized by swinging said boom to said centered position by placing said connecting member in tension prior to lifting said bladder.

3. The method of claim 2 further characterized by said bladder lifting boom being mounted on a sleeve rotatably supported on a substantially vertical post mounted on said platform and a piston cylinder assembly being mounted between said sleeve and said boom, characterized by communicating pressure fluid to said piston cylinder assembly for raising said boom to provide said centering of said boom connecting end of said connecting member.

4. The method of claim 1, wherein said platform is slidably mounted on a supporting frame adapted for lifting engagement with positioning means further characterized by actuating said positioning means to lift said supporting frame to a position adjacent said bladder with said platform being positioned for sliding movement towards said bladder and placing said connecting member in tension to pull said movable platform towards said centered position by raising said boom.

5. The method of claim 3, wherein said piston cylinder assembly is hydraulic and further characterized by communicating hydraulic fluid under pressure to said piston cylinder assembly for lifting said boom.

6. A bladder lifting apparatus for lifting a tire-forming bladder from a centered operating position to a detached lifted position directly over said operating position characterized by:
   (a) a supporting frame movable into a position adjacent said operating position;
   (b) a movable platform slidably mounted on said supporting frame for sliding movement toward and away from said operating position;
   (c) a lifting boom having an inner end swiveled connection to said platform and an outer end extending to a position over said bladder;
   (d) a connecting member extending from said outer end of said lifting boom to said bladder body;
   (e) means to connect said connecting member to said bladder; and,
   (f) means to lift said lifting boom to put said connecting member in tension whereby, said movable platform is moved toward said centered operating position of said bladder and said boom is swiveled to a position with said outer end extending toward said centered operating position, so that said bladder may be raised to said detached position directly over said operating position without any sidewise movement.

7. The lifting apparatus of claim 6 further characterized by said swiveled connecting comprising a substantially vertical post mounted on said platform, a sleeve rotatably mounted on said post, said lifting boom being pivotally mounted on said sleeve and a piston cylinder assembly being mounted between said boom and said sleeve for raising and lowering said boom.

8. The lifting apparatus of claim 7 further characterized by a second moveable platform supported on said frame in side by side relation to said first moveable platform for raising a second tire vulcanizer bladder characterized by a second lifting boom pivotally mounted on a second sleeve supported on a second substantially vertical post mounted on said second platform and a second piston cylinder assembly mounted between said second boom and said second sleeve with a second flexible connecting member extending between said outer end of second boom and said second tire vulcanizer bladder for centering and raising said second tire press bladder upon raising of second boom by said second piston cylinder assembly.

* * * * *